Sept. 11, 1934.  C. W. LANG  1,973,634
METHOD OF TREATING FOOD PRODUCTS AND RESULTING ARTICLES
Filed Aug. 20, 1932
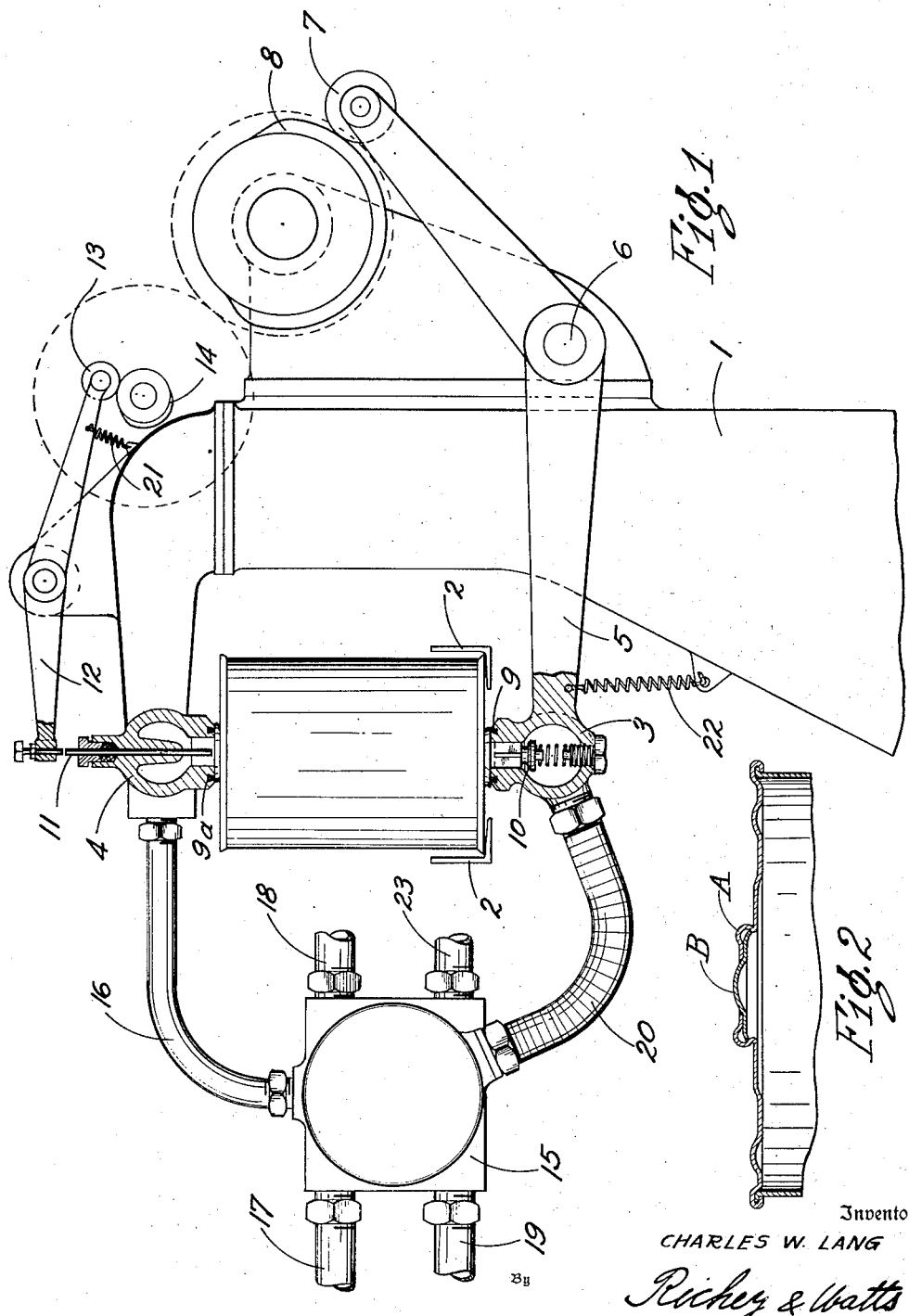
Inventor
CHARLES W. LANG
By Richey & Watts
Attorneys Patented Sept. 11, 1934

1,973,634

UNITED STATES PATENT OFFICE

1,973,634

METHOD OF TREATING FOOD PRODUCTS AND RESULTING ARTICLES

Charles W. Lang, Brooklyn, N. Y., assignor to The Food Processing Company, Philadelphia, Pa., a corporation of Delaware Application August 20, 1932, Serial No. 629,720

14 Claims. (Cl. 99—8)

This invention relates to the art of treating food products. In particular, it is concerned with the treatment of various food products with steam in the final container for the purpose of cooking and/or sterilizing them. It may be practiced on many different food products, whether in liquid or solid form, but it is particularly adapted to the treatment of food products in solid form, such as fruits, vegetables and the like.

Apparatus which may be used in carrying out the present invention is disclosed hereinafter but will be claimed in another application.

According to the present invention, food products in containers are subjected to the action of steam under varying pressures and temperatures and for varying lengths of time. Steam is employed which may have some or no superheat and/or varying amounts of moisture, all depending on the food product being treated and/or the results to be obtained. Steam thus suited for the purpose is brought into the container under pressure, and for a variable length of time, and is permitted to escape from the container after having come into contact with substantially all portions of the food product in the latter. The rate of escape of the steam may be rapid or slow in comparison with the rate of introduction of the steam and depending on the amount of pressure and temperature desired within the container. This escape of steam may continue for varying lengths of time but, for most purposes, a period of somewhere about thirty seconds is satisfactory. The escape of steam from the container is then interrupted while the introduction of steam continues for a further period of time, which may be relatively short, for example, ten seconds, more or less. The pressure and temperature within the container, when the escape of steam is interrupted, increases with further introduction of steam and such pressure may vary widely, even up to about thirty pounds per square inch, but in no case should it exceed the strength of the container. Then the container is closed with the steam pressure therein. Since the steam in the container condenses when the container is cooled, and thus creates a vacuum in the container, it is desirable that the amount of such vacuum, which is permissible with a given container, should be predetermined and steps taken before the container is permanently sealed to prevent the creation in the container of a vacuum sufficiently high to result in collapse of, or other injury to, the container when the latter is cooled. This may be done conveniently in the following manner: A gas, relatively non-condensible as compared with steam, such as nitrogen, may be introduced under pressure into the container after the introduction of steam has ceased and while the steam pressure is present therein. The closed container with steam under pressure therein and with or without such a gas therein is then permanently sealed. In this manner the vacuum within the container produced by steam condensation will be less than would be the case if no such gas had been introduced. By predetermining the amount of such gas so admitted, the amount of final vacuum may be controlled within certain limits.

The contents of the permanently sealed containers are, in the case of most food products, preferably maintained at suitable temperatures and for variable lengths of time, depending upon the particular food product and the result desired. This may be done by controlling the rate of cooling of the contents of the container. The temperatures at which the food products are maintained, and the lengths of time they are maintained at such temperatures, have an important bearing on the sterilizing and cooking action of the steam in the container, for if temperatures above about 212° F. are maintained for several minutes, the sterilizing and cooking action continues at a more or less rapid rate during such interval.

Obvious variations of these steps may be made and additional steps may be included in the process if desired. For example, the food products may be subjected to different steps preliminary to the more important steps just mentioned. Solids, such as vegetables, may be washed, blanched, drained, and sliced or cut into suitable sized pieces before being placed in the containers. Blanching not only removes foreign material, but in certain cases, shrinks the product, or effects the color, or removes gases or may accomplish many other results. Where the blanching step is used the products may be drained and cooled. Draining frees the products from unnecessary liquid, while cooling tends to set the color and firm up the product. In the case of food products such as fruits, the blanching and cooling steps may be omitted. In other instances, soaking in salt brine or in a sugar solution may be desirable to impart a desired taste or flavor to the product. Ordinarily such taste or flavor is imparted to the food products by the addition of a liquid to the solid food product, but according to the present invention, which does not contemplate the use of such a liquor as an essential step in the process, the taste or flavor is imparted by these soaking steps. The soaking steps may be separate from or combined with the blanching step, if one is used. Other preliminary steps peculiar to, or desirable with, other products will be obvious to those skilled in the art.

As a preliminary to treatment of the products in containers with steam as above described, the step of vacuumizing the container and its contents may be resorted to if desired, although in many cases this step may be unnecessary.

Such vacuumizing may be desired where, for example, the food product contains vitamins which are subject to oxidation, an action which is accelerated at temperatures higher than room temperatures. The vacuumizing step tends to remove, more or less completely, the oxygen from the interior of the container before steam enters and raises the contents and thus retards destruction of vitamins when the temperature is later raised by introduction of steam.

The present invention will be better understood by those skilled in the art from a detailed description of the application of the process to one food product.

Satisfactory results have been obtained according to the present invention, by blanching freshly picked peas, of an age suitable for consumption, in water or steam at about 212° F. for about one or two minutes, draining excessive water from the peas and placing them in a No. 1 sanitary can having in the opposite ends valved openings of the type shown in U. S. Patent No. 1,728,533. Steam at about 265° F. was then passed into the container through the bottom end for about thirty seconds and gradually allowed to escape through the top end at such a rate that within that time interval a pressure of about thirteen pounds per square inch was built up in the can. Then the valved opening in the top of the can was closed while the introduction of the steam through the bottom end of the can continued for about ten seconds longer, thereby building up in the can a pressure of about eighteen pounds per square inch and increasing the temperature somewhat. Then the opening in the bottom of the can was closed and both openings were permanently sealed. Thereafter, the container and its contents were held at room temperature for about five minutes and then more rapidly cooled.

Peas processed by this invention are sealed under a vacuum of about twenty-four inches of mercury, are commercially sterile and well cooked, retain their color and substantially all of their original nutritive value, and are dry, that is, little or no free liquor exists in the can.

In general, other food products, particularly solids, when treated according to this invention, have characteristics similar to those just described.

In the drawing accompanying and forming a part of this specification, Fig. 1 is a side elevational view of one form of apparatus for carrying out the invention, and Fig. 2 is a fragmentary sectional view of a can end provided with a valve which may be employed with the apparatus of Fig. 1.

The apparatus of Fig. 1 consists of a supporting standard 1, along the front of which is supported in any satisfactory manner a guideway 2 for cans containing food products to be treated according to the present invention.

The cans are equipped with valves in each end, each valve comprising a raised, centrally perforated portion A, shaped to retain a movable disc B, having a scalloped edge for limited movement therein. The cans are brought into position so that the valves align respectively with a steam header 3 below the can and an exhaust header 4 above the can. The arm 5 is then moved about its pivot 6 as by means of cam rollers 7 and rotating cam 8 until the packing 9 on header 3 engages and makes gas sealing contact with the valve on the lower end of the can and lifts the can sufficiently to bring the upper valve into gas sealing contact with a corresponding packing 9a in exhaust header 4. When the movable member B of the lower can valve reaches the limit of its inward movement, it unseats valve 10 in header 3.

When gas is to be removed from the contents of the container before steam is admitted thereinto, the push rod 11 is forced downwardly by means of the rocker arm 12 actuated by cam roller 13 carried thereby and running in engagement with a rotating cam 14. The push rod 11 opens the valve on the top end of the can. Then the multi-way valve in valve housing 15 is turned so that pipe 16 leading from header 4 to the valve housing 15 is brought into communication with pipe 17 which is in communication with a source of vacuum. After gases have been withdrawn in this manner to the desired extent, the valve in housing 15 is turned to connect the pipe 16 with exhaust pipe 18 and simultaneously to connect pipe 19, which communicates with a source of steam under pressure, with a flexible conduit 20 leading from the valve housing 15 to the steam header 3. Steam then passes into and through the can and escapes through pipe 18. Since the steam does not escape as rapidly from the can as it enters, the steam pressure is rapidly built up in the can. The cam 14 is so designed that after steam has escaped through the top can valve for the predetermined length of time the rocker arm 12 may be retracted as by a tension spring 21, whereupon steam pressure in the can will shift the movable member B of the top valve into can closing position. Steam under pressure may continue to enter the can through the bottom valve until cam 8 permits the rocker arm 5 to shift about its pivot 6, lowering the can onto the table 2 and breaking the communication of header 3 with the interior of the can. A tension spring 22 or its equivalent may be used for the expediting of this movement of arm 5. As soon as the connection between header 3 and the can has been broken, the steam pressure within the can shifts the movable member B of the bottom valved can into can closing position. Then the can may be removed from the machine and both valves permanently closed by any suitable means.

In the event that it is desirable to introduce a relatively non-condensing gas under pressure into the can after steam has been introduced thereinto for a sufficient length of time, this may be accomplished readily before retraction of the arm 5 takes place by simply shifting the valve in housing 15 so as to connect pipe 23, communicating with a source of suitable gas under sufficient pressure, with pipe 20.

It will be understood, of course, that the cam 8 should be so designed as to permit the introduction of the desired amount of such gas before the rocker arm 5 is retracted as above described.

Having thus described the present invention so that those skilled in the art may be able to practice the same, what is desired to be secured by Letters Patent is defined in what is claimed.

What is claimed is:

1. The process of treating food products which comprises continuously bringing steam into contact with a food product in a container, permitting escape of some of the steam from the container, creating a steam pressure in the container, and finally interrupting the flow of steam into the container and sealing the container with steam therein under greater than atmospheric pressure.

2. The process of treating food products which comprises continuously admitting steam under pressure into a container for a given period of time and in a manner to bring the steam into contact with substantially all the food products in the container, permitting escape of the steam from the container for a part of the given period of time, then preventing further escape of steam from the container while admission of steam into the latter is continued, and finally interrupting the flow of steam into the container and sealing the container with steam therein under greater than atmospheric pressure.

3. The process of treating food products which comprises permitting steam to pass thru a container for a given period of time and to come into contact with food products in the latter, then creating a high steam pressure within the container, delivering a relatively non-condensible gas into the container and finally sealing the container with a pressure therein greater than atmosphere.

4. The process of treating food products which comprises continuously bringing steam under pressure into contact with a food product in a container, permitting the steam to escape from the container at a slower rate than it enters thereby creating a positive steam pressure in the container, increasing said pressure by the continued introduction of steam into the container, and finally interrupting the flow of steam into the container and sealing the container with steam therein at high pressure.

5. The process of treating food products which comprises bringing steam under pressure into contact with a food product in a container, permitting the escape of the steam from the container, creating a positive steam pressure in the container, introducing into the container a gas relatively non-condensible as compared with steam, and permanently sealing the container with steam and said gas therein under high pressure.

6. The process of treating food products which comprises establishing a continuous flow of steam under pressure into and through a container in a manner to bring the steam into contact with substantially all portions of a food product in the container, controlling the rate of flow of steam out of the container thereby increasing the pressure and temperature of the steam within the container, interrupting the flow of steam into and out of the container when the desired pressure and temperature within the container has been attained, and permanently sealing the container with steam therein under greater than atmospheric pressure.

7. The process of treating food products which comprises removing gases from the container, establishing a continuous flow of steam under pressure into and through a container in a manner to bring the steam into contact with a food product in the container, increasing the temperature and pressure of steam in the container by controlling the rate of flow of steam from the container, interrupting the flow of steam into and out of the container when the desired pressure and temperature within the container have been attained, and finally sealing the container permanently with steam therein under greater than atmospheric pressure.

8. The process of treating food products which comprises establishing a flow of steam under pressure through a container in a manner to bring the steam into contact with substantially all portions of a food product in the container, controlling the rate of escape of steam from the container thereby increasing the temperature and pressure of steam within the container, interrupting the flow of steam into the container, introducing into the container a gas relatively non-condensible as compared with steam after the flow of steam into the container has been interrupted, and finally sealing the container permanently with steam and said gas therein under greater than atmospheric pressure.

9. The process of treating food products which comprises establishing a continuous flow of steam under pressure into and through a container in a manner to bring the steam into contact with substantially all portions of a food product in the container, controlling the rate of escape of steam from the container thereby increasing the temperature and pressure of steam within the container, interrupting the flow of steam out of the container, interrupting the flow of steam into the container when the desired temperature and pressure within the container have been attained, sealing the container permanently with steam therein under greater than atmospheric pressure, and continuing the heating action of the steam in the permanently sealed container for a short period of time.

10. The process of treating food products which comprises establishing a flow of steam under pressure through a container in a manner to bring the steam into contact with substantially all portions of a food product in the container, controlling the rate of escape of steam from the container thereby increasing the temperature and pressure of steam within the container, interrupting the flow of steam into the container, introducing a gas relatively non-condensible as compared with steam into the container after the flow of steam into the container has been interrupted, sealing the container permanently with steam and said gas therein under greater than atmospheric pressure, and continuing the heating action of the steam in the permanently sealed container for a short period of time.

11. The process of treating perishables which comprises putting the perishables in a container, continuously passing a treating agent thru the container in a manner to bring the treating agent into contact with substantially all the perishables, controlling the flow of the treating agent thru the container so that a pressure can be built up in the container, interrupting the flow of steam into the container when the desired pressure within the container has been attained, and sealing the container with the desired pressure therein.

12. The process of treating perishables which comprises putting the perishables in a container, continuously passing a treating agent thru the container, controlling the flow of the treating agent thru the container, interrupting the flow of steam from the container, interrupting the continuous flow of steam into the container when the desired temperature and pressure within the container have been attained, and sealing the container.

13. The process of treating perishables which comprises putting the perishables in a container, continuously passing a treating agent thru the container in a manner to bring the treating agent into contact with substantially all the perishables, interrupting the flow of treating agent from the container while it continues to enter the container, interrupting its flow into the container when the desired pressure and temperature within the container have been attained, and sealing the container.

14. That method of simultaneously canning and cooking food which comprises placing the food in a receptacle, continuously passing a hot fluid thru the receptacle in such a manner as to contact with substantially all the food in the container and to cook the food, increasing the pressure within the receptacle by interrupting the flow of hot fluid from the receptacle while continuing its flow into the receptacle, interrupting the flow of hot fluid into the receptacle when the desired pressure in the container has been attained, and sealing the receptacle while maintaining a portion of the hot fluid under pressure in the receptacle.

CHARLES W. LANG.